United States Patent
Lehtonen et al.

(10) Patent No.: US 6,444,329 B1
(45) Date of Patent: Sep. 3, 2002

(54) METHOD OF PRESERVING PLYWOOD AND PARTICLE BOARD AGAINST DECAY AND MOULD

(75) Inventors: Markku Lehtonen, Routio (FI); Markku Lähteenmäki, Hollola (FI); Anne-Christine Ritschkoff, Helsinki (FI); Jaakko Korpela, Jyväskylä (FI)

(73) Assignees: UPM-Kymmene Oy, Helsinki (FI); Koskisen Oy, Jarvela (FI); Metsalitto Osuuskunta, Espoo (FI)

( * ) Notice: Subject to any disclaimer, the term of this patent is extended or adjusted under 35 U.S.C. 154(b) by 0 days.

(21) Appl. No.: 09/209,946

(22) Filed: Dec. 11, 1998

Related U.S. Application Data

(63) Continuation of application No. 08/768,646, filed on Dec. 18, 1996, now abandoned.

(30) Foreign Application Priority Data

Dec. 29, 1995 (FI) .................................... 956332

(51) Int. Cl.[7] ............................... B32B 21/08

(52) U.S. Cl. .................... 428/528; 156/331.3; 524/127; 524/239

(58) Field of Search .................. 156/331.3; 524/127, 524/239; 428/528

(56) References Cited

U.S. PATENT DOCUMENTS

| | | | | |
|---|---|---|---|---|
| 2,750,323 A | * | 6/1956 | Schmitz-Hillebrecht et al. | 156/327 |
| 3,406,138 A | * | 10/1968 | Anas et al. | 524/239 |
| 5,374,678 A | * | 12/1994 | Collins et al. | |

FOREIGN PATENT DOCUMENTS

| JP | 63-30582 | * | 2/1988 |
|---|---|---|---|

* cited by examiner

Primary Examiner—John J. Gallagher
(74) Attorney, Agent, or Firm—Hoffmann & Baron, LLP

(57) ABSTRACT

The present invention is related to a method of preserving plywood, particle board and similar wood composite products made from wood pieces/particles and a binder used to adhere such wood pieces/particle together against rot and mould decay. According to the invention, the preservative of the wood material is a complexing agent which is capable of binding transition group metals and is admixed into the binder used in the manufacture of said wood composite products prior to the formation of said product. The invention also concerns a binder composition, which contains a polymer resin as its adhesive component and a complexing agent, particularly an aminotetracarboxylic acid or a salt thereof, by approx. 1–30 wt.-% as the preservative of the wood material, and a method of producing said binder composition. Tests performed on faced plywood indicated that a water-soluble, environmentally safe complexing agent offers a white rot resistance which is superior to conventional preservatives commonly used today.

14 Claims, No Drawings

METHOD OF PRESERVING PLYWOOD AND PARTICLE BOARD AGAINST DECAY AND MOULD

CROSS REFERENCE TO RELATED APPLICATION

This application is a continuation application of U.S. application Ser. No. 08/768,646 filed on Dec. 18, 1996, now abandoned.

BACKGROUND OF THE INVENTION

1. Field of the Invention

The present invention relates to a method for preserving plywood and particle board against undesirable reactions caused by microorganisms, particularly those caused by fungi and moulds, resulting in decay, mould and blue-stain deterioration of wood.

According to the present method, a wood composite product is made from separate wood pieces by joining said pieces together with an adhesive or binder. The wood pieces may comprise planar wood veneer sheets or smaller wood particles (chips, sawdust or wood powder). The preserving additive possessing growth- and spreading-inhibiting properties against microorganisms is mixed into the base adhesive used in the method.

The invention also concerns an adhesive composition with particularly advantageous properties for producing plywood and particle boards, as well as methods for preparing such an adhesive composition.

2. Description of Related Art

Rot fungi and other microorganisms use the structural components of wood in their metabolism or degrade wood by the growth of their colonies. Wood degradation, particularly in the form of an essential loss of its strength properties, is chiefly caused by rot fungi, of which brown-rot, white-rot and cubical dry-rot fungi deserve mentioning. Further, the species of these fungi causing the greatest damages are those of the brown-rot fungi including dry-rot fungus (*Serpula lacrymans*), cellar fungus (*Coniophora puteana*) and white-pore fungi (Poria sp., Antrodia sp., Fibroporia sp.). Brown-rot fungi decompose the polysaccharides of wood causing rapid deterioration of wood strength properties already during the initial state of rot, even prior to a detectable weight loss of the wood.

Damage to wood is also caused by blue-stain and mold fungi mostly causing discolouration defects. The blue-stain fungi may in some cases bring about a minor weight loss in the wood, however, generally less than 3%. When occurring in great abundance, blue-stain fungi modify the permeability properties of wood, whereby wood becomes more permeable to water, whereby favourable growth conditions may be formed for the actual rot fungi.

The most common blue-stain fungi found in wood are those of the Ambrosiella, Aureo-basidium, Ceratocystis, Cladosporium, and Phialosphora families. Blue-stain fungi most frequently occurring in pine wood material are Aureobasidium pullulans, and the species of the Ceratocystis family such as *C. pilifera*. In addition to these, blue-staining of sawn spruce is caused by such species as, e.g., *Ceratocystis piceae* and *C. coerulens*. In addition to the fungi of the families mentioned above, blue-staining of sawn pine is also caused by species of the Sclerophoma family such as *Sclerophoma entoxylina*. Of fungi causing mould damage, the most important to mention are species of the Cladosporium, Altenaria, Helminthosporium, Penicillium, Aspergillus, Epicoccus and Rhizopus families. Mold fungi belonging particularly to the Penicillium and Aspergillus families cause extensive damage in indoor spaces and structures.

To preserve wood against decay and damage caused by microorganisms, different types of methods and preservative compositions have been developed. The most common method is to subject wood to pressure impregnation with preservatives (e.g., salt preservatives and creosote oil), which are capable of preventing growth of microorganisms in wood. With plywood and other similar wood composite materials, the most commonly used preservation treatment comprises admixing the preservative into the adhesive during the manufacture of the composite sheet. Typically, the active preservative compound to be admixed into the adhesive is selected from the group of chlorinated phenols, organic tin compounds, fluorides, and today, Xyligen, moraside and xylasane compounds. Besides using a preservative in the adhesive, wood composite products may be protected by spraying the wood veneer sheets or chips with a preservative solution. Veneer sheets may also be treated by immersion. Ready-laminated sheets can be protected by pressure or vacuum impregnation, whereby the preservatives are selected from the groups of salt preservatives and oil-based preservative formulas containing organic tin compounds.

A disadvantage of preservatives used for impregnating sawn goods is their general toxicity necessitating the handling of such preservative residues and wood blocks treated with them as hazardous waste. Also the other above-mentioned preservative compositions used for preserving wood composite products are handicapped by the same problem.

FI Patent No. 90,951 discloses a wood preservation method capable of overcoming the problems associated with conventional preservation of sawn wood material. In the method disclosed therein, complexing agents are used to bind in the wood into chelates at least a portion of the metals, which are essential to the metabolism of the decaying microorganisms. Preservation of wood in the method is carried out in a conventional manner by impregnating the wood being treated with a solution of the complexing agent.

Up to now, the use of complexing agents in the preservation of plywood and similar wood composite products has not been considered in the art. In particular, the preservation of plywood and particle board or similar wood composite products made from wood pieces/particles and a binder used to adhere such pieces/particles together against decay and moulds by means of admixing complexing agents into the binder used in the fabrication of said products during the manufacturing process for the specific purpose of improving the resistance of the wood product to deterioration and decay due to fungi and mold has not been considered. According to the prior knowledge of the art, this has not been considered possible, because the adhesives used in the process are two-component formulations, in which the hardeners contain metals capable of reacting with the complexing agents. For instance, the hardener of conventional plywood bonding adhesive contains, among other components, wood bark extract and chalk, whereby large amounts of heavy metals and other metallic compounds are contained therein. On the basis of such knowledge, a conclusion has been made in the art that the admixture of complexing agents into the adhesive of plywood and similar materials would decisively deteriorate the properties of the adhesive resulting in the precipitation, change of pH and inhibition of gel formation in the adhesive.

SUMMARY OF THE INVENTION

It is an object of the present invention to overcome the drawbacks of the above-described prior-art techniques and to provide an entirely novel method for preserving plywood, particle board and similar wood composites against rot, mould and other similar decay and quality-degrading reactions.

It is another object of the present invention to provide a wood composite product which is protected against rot, mould and other similar decay and quality-degrading reactions.

It is a third object of the present invention to provide a binder composition for use in the manufacture of wood composite products, and it is still a further object of the present invention to provide a method of producing a binder suited for use in the manufacture of plywood, particle board and similar wood composite products.

These and other objects of the invention are achieved through preserving the wood composite against the undesirable reactions caused by the above-mentioned microorganisms by admixing into the adhesive or binder compound used in the manufacture of plywood and particle board such complexing agents that are capable of forming chelates with metals essential to the rot mechanisms and general metabolism of fungi. In fact, the invention is based on an unexpected discovery that, contrary to a general belief, a chelate-forming agent admixed into the adhesive can migrate from the adhesive due to the moisture released from the adhesive and the processing conditions of sheet products into the veneer sheet or chips of the product without causing any significant changes in the composition or properties of the adhesive. By contrast, it has been found that complexing agents can accelerate the cure of a phenolic resin adhesive in plywood manufacture and, when admixed into the melamine urea formaldehyde resin used in particle board bonding, such complexing agents may even improve the cross-sheet tensional strength of the produced boards.

In the wood material of plywood and particle board, the chelating compound forms complex compounds with the transition group metals, principally iron and manganese, and other metals essential to rot fungi and other similar microorganisms, thereby essentially improving the resistance of a wood composite product to rot and fungi.

According to the invention, the complexing agent is particularly advantageously admixed into the adhesive or binder already during the blending thereof. Thus, when a low-solubility complexing agent such as, e.g., divalent sodium salt of EDTA is used, the heat released by the exothermic condensation reaction of the binder can be utilized to improve the solubility of the complexing agent.

Besides conventional cross-ply laminated plywood and particle board, different types of lumber-core plywood and other boards and structural components formed from wood particles by adhesive bonding will be included under the term "wood composite products" as used herein. Hence, the method may also be used in the preservation of, e.g., beams made from strip-like particles of veneer. The wood particles may be of coniferous or deciduous wood, or a combination thereof

DETAILED DESCRIPTION OF THE INVENTION

In the context of the present invention, the term "undesirable reactions" of microorganisms refers principally to deterioration and decay of wood due to fungi and moulds. The deterioration of wood, that is, an essential loss of its strength properties, is chiefly caused by rot fungi which include the brown-rot and white-rot fungi mentioned above. Damage to wood (in the form of discolouration defects) is caused, among other microorganisms, by blue-stain and mold fungi listed above. However, the weight loss caused by them is insignificant.

The invention can be used for preserving wood against undesirable reactions caused by any of the above-mentioned microorganisms.

In the context of the present invention, the term "complexing agent" (or "chelating agent") refers to a compound capable of binding di- or trivalent cations into insoluble or soluble complex compounds.

Complexing agents used for binding metals are chiefly water-soluble, which makes them excellently suited for admixing into an adhesive. The adhesive primarily used for bonding of veneer sheets is phenolic resin. Bonding of particle boards intended for use under damp conditions is made using urea melamine resin.

Complexing agents can be divided into the groups of inorganic and organic compounds. The group of inorganic complexing agents consists of different cyclic and linear phosphate compounds including polyphosphates such as sodium polyphosphate ($Na_5P_3O_{10}$, STPP). The most important organic complexing agents are amino carboxylic acids and their salts in which the acid part is formed by acetic acid, whereby examples of such agents include ethylenediamine tetraacetic acid (EDTA), n-hydroxyethylethylenediamine triacetic acid (HEDTA), diethylenetriamine pentaacetic acid (DTPA), nitrilo triacetic acid (NTA), ethylenediamine-di-(o-hydroxyphenyl acetic acid) (EDDHDA), diethanol glycine (DEG) and ethanol glycine (EDG) as well as salts thereof, particularly their alkali metal salts; hydroxy acids including gluconic acid, glucoheptonic acid and other sugar acids such as β-glucoisosaccharic acid, α-isosaccharic acid, tartaric acid, malic acid and citric acid as well as salts thereof; and organophosphates in which the acid part is formed by phosphoric acid, whereby examples of such agents include aminotrimethylene phosphonic acid (ATMP), 1-hydroxyethylidene-1,1-diphosphonic acid (HEDP), ethylenediaminetetramethylene phosphonic acid (EDTMP), diethylenetriaminepentamethylene phosphonic acid (DTPMP) and salts thereof.

The invention can also be implemented using metal-binding phenolates or catecholates such as the biological chelating agents, known as siderophores, which are produced by microorganisms. Siderophores are complexing agents excreted by microorganisms for the purpose of binding metal ions, particularly iron, from the substrate for the metabolism of the organism. The siderophores produced by some fungi (Trichoderma sp.) and bacteria (Pseudomonas sp.) have been found to possess an inhibiting function to the growth of other microorganisms, based on the strong affinity of the siderophores for the iron contained in the growth substrate.

According to a preferred embodiment of the invention, the complexing agent used is aminocarboxylate or aminocarboxylic acid, most appropriately aminotetracarboxylates or aminotetracarboxylic acids. In the examples to be described later, ethylenediamine tetraacetic acid (EDTA) and its salts (ethylenediamine tetraacetates) are used with a particularly high efficiency in the method according to the invention. Suitable salts of EDTA are its alkali metal salts, particularly the sodium salts, $Na_2$-EDTAc and $Na_4$-EDTAc.

According to the invention, into the adhesive or binder used in the manufacture of plywood and particle board is admixed such an efficient amount of a complexing agent that is sufficient for achieving preservation of the wood material. Along with the adhesive, the preservative is transferred into the wood veneer sheets or chips of the particle board so that a maximally large proportion of the metals natively contained in the wood can be bound into a form unsuitable for participating in the general metabolic reactions of fungi or catalyzing the reactions of the decay process. In practice, at least approx. 10%, advantageously over approx. 20% of all the above-mentioned metals contained in the wood are bound.

The properties of the complexing agent, particularly its solubility as well as the solvent of the complexing agent and the binder used are the factors that determine the admixing temperature of the complexing agent. Advantageously, the admixing step is carried out at about 5° C. to about 110° C. Typically, the operation is carried out at room temperature from about 15° C. to about 25° C. For low-solubility complexing agents, an elevated temperature is preferred. Thus, the admixing of, e.g., $Na_2$-EDTA into the adhesive is preferably made at a temperature of at least 30° C., particularly advantageously at about 40–110° C. (Under ambient pressure conditions, the upper temperature limit is about 95° C.)

According to a preferred embodiment of the invention, the complexing agent is admixed into the adhesive composition already during its preparation. Admixing may be made in conjunction with the polymerization of the polymer resin acting as the binder and/or immediately thereafter. Thence, when preparing a phenol formaldehyde based resin, the complexing agent (or a part thereof) can be metered with the phenol-formaldehyde resin, as well as the catalyst possibly used therein, in the condensation reactor, whereby the complexing agent is dissolved in the aqueous phase of the reaction mixture (typically containing 40–60% water) under the heat released by the condensation reaction. Typically, the reaction temperature in the reactor reaches approx. 70–110° C. (under ambient pressure conditions maximally approx. 95° C.), whereby the solubility of, e.g., $Na_2$-EDTA and similar low-solubility complexing agents into the adhesive composition is increased manifold. Another alternative is to admix the complexing agent into the resin mixture immediately after the completion of the condensation reaction before the cooling thereof is started.

The catalyst in the phenol-formaldehyde condensation reaction typically is an acid (e.g., HCI), a base (e.g., NaOH) or an amine. Because many of the suitable complexing agents also contain amine groups, the catalyst may frequently be replaced by the complexing agent in the blending of the binder.

In proportion to the amount of binder resin used, into the raw material mixture is admixed the complexing agent by approx. 1–30 parts per weight and the other starting materials (including water contained therein) by approx. 99–70 parts per weight, respectively, to obtain an adhesive composition in which the amount of the complexing agent is approx. 1–30 wt-%, advantageously approx. 2–20 wt-%.

Besides for phenol formaldehyde resin adhesives, the above-described arrangement is generally applicable to the preparation of such adhesive compositions which contain a resin producing heat during its polymerization reaction or which are polymerized by heating the mixture of starting materials to a temperature of at least approx. 40° C.

As noted above, the amount of the complexing agent may be varied widely in the adhesive composition. Typically, the goal is to admix into the adhesive or binder so much of the preservative that its amount in the end product is approx. 1–30 kg/m³ wood, advantageously approx. 5–20 kg/m³ wood.

Complexing agents can be used particularly advantageously admixed into two-component adhesives such as phenolic resin binders and melamine urea formaldehyde resins. Most appropriately complexing agents are used in conjunction with such adhesives that are miscible with polar solvents such as water and after drying/curing become water-insoluble. Thence, particle boards for use under damp conditions can be made by using binders in which complexing agents and melamine urea formaldehyde resins are combined.

The adhesive containing the complexing agent may be brought onto the surface of the wood pieces/particles being processed with the help of conventional glue application techniques such as spraying, or in conjunction with the lay-up of sheets, using brush/roll application.

Water is advantageously used as the solvent or dispersant of the preservative, and the preservative composition may also contain other conventional admixtures capable of promoting the penetration of the solution or dispersion into the wood. Besides biologically inert admixtures, the preservative composition according to the invention can contain conventional biologically active compounds such as copper ions or complex compounds of copper.

The invention provides significant benefits. Thence, as mentioned above, the wood preservative composition according to the invention is water-soluble and miscible in an adhesive or binder, which makes it environmentally compatible in this respect. Further, the preservative does not contain any substances of general toxicity, but rather is highly specific to wood-decaying microorganisms, particularly fungi, occurring in wood. The method according to the invention utilizes efficiently the capability of chemical complexing agents and siderophores produced with the help of microorganisms in binding iron, other metals of the transition group and bioactive compounds contained in the substrate formed by the product so as to prevent the growth and colonization of fungi.

A further unexpected discovery has been made therein that a complexing agent admixed into the phenolic resin binder of a plywood product can speed the cure of the binder and that the strength properties of particle boards made using melamine urea formaldehyde resin (MUF) as the binder are improved if a complexing agent is admixed into the binder. Additionally, tests performed on faced plywood have shown that a complexing agent can give a better protection against decay by white rot than the conventionally used preservative (Xyligen).

In the following, the invention will be examined in more detail with the help of a number of examples which are nonlimiting to the applications of the invention.

EXAMPLE 1

Effect of EDTA as a Preservative of Plywood on the Viscosity and Other Properties of the Binder Used A. Binder Used The test was carried out using a phenolic resin binder which was hardened using a mixture of paraformaldehyde with fillers. The binder was blended according to the manufacturer's instructions as follows:

| | |
|---|---|
| phenolic resin (Exter 4012) | 100 g |
| powderized hardener (Series 2500) | 17 g |
| distilled water (incl. chelating agent) | 18 g |

According to information obtained from the manufacturer, the hardener contained paraformaldehyde, wood powder, an extract of quebracho wood and chalk as its major components.

B. Chelating Agent Tested

The chelator, $Na_4$-EDTA, was mixed in distilled water to make three concentrations (in weight-%), namely, 1% EDTA, 5% EDTA and 10% EDTA.

The amount of chelating agent used was calculated as a proportion of the solids content of the phenolic resin. The chelating agent was mixed into the water used for the preparation of the binder.

C. Testing of the Properties of a Binder Mixture Containing a Chelating Agent

The mixture of the binder with the chelating agent was allowed to stabilize overnight before the tests. The gelling degree of the binder mixture was determined by adding a known aliquot of the mixture to be tested into a test tube. The binder mixture was next brought to 102° C. temperature (by heating in a water-glycolic acid mixture) and the binder mixture was agitated lightly until the so-called "lollipop" effect was achieved. The gelling degree was plotted as a function of time (using a chronometer). Additionally, the pH and viscosity (using a Brookfield digital viscometer) of the binder mixture were determined.

TABLE 1

Effect of $Na_4$-EDTA on the properties of phenolic resin binder

| Sample | pH | Viscosity (mPas$^{-1}$) | Curing time (min) |
| --- | --- | --- | --- |
| Control | 11.6 | 540 | 16.4 |
| 1% EDTA | 11.6 | 510 | 16.4 |
| 5% EDTA | 11.6 | 520 | 15.2 |
| 10% EDTA | 11.6 | 600 | 14.3 |

According to the test, the admixing of the chelating agent into the binder mixture does not essentially alter the viscosity, pH and gelling properties of the binder.

EXAMPLE 2

Effect of Chelating Agent on the Strength of the Binder Bond

The strength tests were carried out on a 3-ply spruce plywood using a Humprey apparatus developed for strength testing under the following conditions:

| | |
| --- | --- |
| Binder application time | 1 min |
| Precompression time | approx. 5 min with 0.3 N/m$^2$ pressure |
| Post-precompr. rest interval | 0–20 min |
| Compression time | 4 min |
| Compression temperature | 135° C. |
| Compression pressure | 1.2 N/m$^2$ |

Table 2 below lists the shear strength (N/m$^2$) for plywood and the breaking strength (%) for wood.

TABLE 2

Effect of chelating agent on the shear strength of veneer and breaking strength of wood

| Binder admixing ratio (preservative in wt-% of phenolic resin binder solids) | Shear strength (N/m$^2$) | Breaking strength (%) |
| --- | --- | --- |
| Control | 1.28 | 100 |
| 10% $Na_4$-EDTA | 1.27 | 93 |

As can be seen from the results, the admixing of the chelating agent does not essentially impair the strength of the binder bond.

EXAMPLE 3

Efficacy of EDTA Admixed Into the Binder as a Rot Preservative of Plywood

The efficacy of EDTA admixed into the binder as a rot preservative of plywood was tested under test conditions conforming to the EN 113 standard. EDTA was admixed into the binder so that the amount of the preservative with respect to the volume of wood in plywood was 3.5 kg/m$^3$, 5.5 kg/m$^3$ or 10.0 kg/m$^3$. Sheets of birch veneer were laminated into 7-ply test boards for the binder bonding strength and rot decay tests. The manufacturing conditions of the plywood were as follows:

| | |
| --- | --- |
| Binder application amount | 160–177 g/m$^2$ (approx. 80–90 g/sheet) |
| Post-application rest interval | 5, 20 and 30 min |
| Precompression pressure | 0.8 MPa (pressure curve K2) |
| Precompression time | 7 min |
| Post-precompr. rest interval | 20 min, 30 min and 4 h |
| Hot compression pressure | 1.7/0.8/0.4 MPa (pressure curve K1) |
| Hot compression temperature | 135° C. |
| Hot compression time | 7.5 min (450 s) |

The precompression adhesion of the sheets was good. The boards fulfilled the requirements of the BFU 20 standard.

The test pieces made from the birch plywood were cut to 50×50 mm size and brown rot *Coniophora puteana* and white rot *Pleurotus ostreatus* were used as test fungi species.

The rot resistance test lasted 16 weeks and the efficacy of the preservation treatment was assessed from the weight losses caused by the decaying fungi. Prior to the test, the test pieces were subjected to evaporation at 40° C. for about 4 weeks. The purpose of evaporation was to reduce the amount of small-molecular-weight compounds in the phenolic resin binder that could have inhibited the growth of the fungi. The comparative control pieces for the test were made from preservative-free plywood and Xyligen-protected (with an amount of 10 kg/m$^3$ wood) plywood. The test results are listed in Table 3 below.

TABLE 3

Rot resistance of plywood containing a preservative in the binder under test conditions conforming to EN 113

| Treatment | Weight loss (%) P. ostreatus | Weight loss (%) C. puteana |
| --- | --- | --- |
| Control | 12.6 | 2.4 |
| EDTA, 3.5 kg/m$^3$ | 6.3 | 1.6 |
| EDTA, 5.5 kg/m$^3$ | 4.5 | 1.8 |
| EDTA, 10 kg/m$^3$ | 5.4 | 2.2 |
| Xyligen, 10 kg/m$^3$ | 5.4 | 0.7 |

EXAMPLE 4

Effect of EDTA on Plywood Properties

For this test, under laboratory conditions were manufactured 3-ply particle boards with a nominal thickness of 12 mm. The particle boards were made chiefly from coniferous wood, while also a small quantity of deciduous wood chips was included. The binder was a melamine urea formaldehyde resin (MUF) conventionally used in particle boards. The preservative was administered into the chips as an aqueous solution in conjunction with binder application. The amount of preservative used was calculated for a total quantity of 10 kg/m$^3$.

TABLE 4

Effect of EDTA on the strength properties of particle board

| Treatment | Bending strength (N/mm$^2$) | Cross-sheet tensional strength (N/mm$^2$) |
| --- | --- | --- |
| Control | 18.3 | 0.91 |
| Na$_2$-EDTA | 18.7 | 1.22 |
| Na$_4$-EDTA | 16.3 | 1.14 |

As can be seen from the results of the table above, the admixing of the chelating agent can clearly improve the strength properties of particle boards made using MUF as the binder.

EXAMPLE 5
Rot Resistance of Particle Board Made Using EDTA as the Preservative The rot resistance of particle boards made using MUF as the binder was tested under test conditions modified from those of the EN 113 standard. The rot resistance test lasted 16 weeks and brown rot *Coniophora puteana* and white rot *Coriolus versicolor* were used as the test fungus species. The test pieces were not rinsed prior to the rot resistance test. Comparative control test pieces were made from preservative-free particle boards made using MUF as the binder, and virulence control pieces made from pine sapwood.

TABLE 5

Rot resistance of particle board containing EDTA as the preservative

| Treatment | Weight loss (%) C. puteana | Weight loss (%) C. versicolor |
| --- | --- | --- |
| Control | 53.1 | 23.9 |
| Na$_2$-EDTA | 5.0 | 3.5 |
| Na$_4$-EDTA | 1.1 | 0.7 |
| Pine sapwood control piece | 40.2 | 12.4 |

As can be seen from the test results above, particle boards having MUF as the binder and EDTA as the preservative showed good decay resistance against both brown and white rot species. Since the admixing of the complexing agent into the binder also effects an improvement of the particle board strength properties, the present method is excellently suited for preserving particle boards used under very damp conditions against mould and rot decay.

EXAMPLE 6
Effect of Facing and Edge Protection on the Rot Resistance of Plywood Boards Made with a Preservative-containing Binder The test pieces for this test were made from three birch plywood grades: one manufactured using EDTA (Detarex) as the preservative (10 kg/m$^3$), the other manufactured using Xyligen as the preservative (10 kg/m$^3$) and the third not containing a preservative. The plywood boards were faced on both sides with a 220 g/m$^2$ phenolic resin film. During the manufacture of the plywood boards, one side was laminated with a wire-textured film and the opposite side with a glossy film. The boards were sawn for the rot resistance test into 50×50 mm test pieces, of which half the pieces were coated at their edges with acrylic latex paint.

Two test fungus species were selected for the test: brown rot *Coniophora puteana* and white rot *Pleurotus ostreatus*.

The rot resistance test was carried out in conformance with the EN 113 standard and a number of the plywood test pieces were rinsed in conformance with the EN 84 standard (for 14 days with distilled water). The rot resistance test lasted 16 weeks.

The results of the rot resistance test are given in Table 6. The weight loss results are given as an average weight loss of 4 parallel tested pieces.

TABLE 6

Rot resistance of faced and edge-protected plywood boards

| Treatment | Weight loss (%) C. puteana | Weight loss (%) P. ostreatus |
| --- | --- | --- |
| Edges protected: | | |
| EDTA | 0.3 | 0 |
| EDTA + rinsing | 0 | 0 |
| Xyligen | 0.1 | 0.1 |
| Xyligen + rinsing | 0 | 0 |
| Comp. control | 2.4 | 12.6 |
| Comp. control + rinsing | 46.7 | 22.8 |
| Edges unprotected: | | |
| EDTA | 0.2 | 0.5 |
| EDTA + rinsing | 37.4 | 14.5 |
| Xyligen | 1.5 | 4.4 |
| Xyligen + rinsing | 36.2 | 32.0 |
| Comp. control | 2.7 | 24.5 |
| Comp. control + rinsing | 34.1 | 33.2 |

As can be seen from the test results, faced and edge-protected plywood board is resistant to brown rot and white rot fungi when not rinsed. In this part of the test, no difference could be found between plywood boards containing either EDTA or Xyligen as the preservative. In fact, protection of board edges could under these conditions prevent the decay of preservative-free boards, too. Also in the rot test subsequent to rinsing, EDTA or Xyligen proved efficient preservatives against rot.

In the rot test subsequent to rinsing, a faced plywood board without edge protection proved resistant to rot fungi if the binder contains either EDTA or Xyligen as a preservative. Against white rot, this part of the test proved EDTA superior to Xyligen as a preservative.

What is claimed is:

1. A method of preserving plywood, particle board and similar wood composite products made from wood pieces/particles of a type normally susceptible to deterioration and decay from fungi and mold, and a binder used to adhere such wood pieces/particles together against rot and mold decay, comprising:

(a) admixing a complexing agent used as a preservative of the wood pieces/particles, which is capable of binding transition group metals and preventing rot caused by fungi and mold, into the binder used in the manufacture of said wood composite products prior to the formation of said products; and (b) contacting said admixture of said complexing agent and said binder with said wood pieces/particles to provide adhesion therebetween, thus forming the wood composite product;

wherein said complexing agent is present in an amount of 2 to 30 wt. % of the total admixture; and wherein the complexing agent used is ethylenediamine tetraacetic acid (EDTA), nitrilo triacetic acid (NTA), n-hydroxyethyl ehtylenediamine triacetic acid (HEDTA), diethylene triamine pentaacetic acid (DTPA), ethylenediamine-di-(o-hydroxyphenyl acetic acid) (EDDHDA), diethanol glycine (DEG) or ethanol glycine (EDG), or an alkali metal salt thereof; and wherein the binder is a phenolic resin adhesive or urea melamine resin adhesive.

2. The method according to claim 1, wherein the complexing agent is admixed into the binder by so much that the amount of preservative in the end product is approx. 1–30 kg/m$^3$ wood, advantageously approx. 5–20 kg/m$^3$ wood.

3. The method according to claim 1, wherein the complexing agent is admixed into the binder at a temperature of 5–80° C.

4. The method according to claim 3 using Na$_2$EDTA as the complexing agent, wherein the complexing agent is admixed into the binder at a temperature of approx. 30–80° C.

5. The method according to claim 1, wherein a particle board for use under damp conditions is manufactured using melamine urea formaldehyde resin as the binder with EDTA or a sodium salt thereof admixed thereinto.

6. A method according to claim 1, wherein said complexing agent is present in an amount of at least 5 wt % of the total admixture.

7. A method according to claim 6, wherein said complexing agent is present in an amount of at least 10 wt % of the total admixture.

8. A method according to claim 1, further comprising the steps of:

(c) coating at least one face of said plywood composite product with a film of said binder.

9. A method according to claim 8, wherein said complexing agent is present in an amount of at least 10 wt % of the total admixture.

10. A method of preserving plywood, particle board and similar wood composite products made from wood pieces/particles and a binder used to adhere such wood pieces/particles together against rot and mold decay, comprising:

(a) admixing i) a complexing agent selected from the group consisting of ethylenediamine tetraacetic acid (EDTA) and an alkali metal salt thereof, as a preservative of the wood material, and ii) a melamine urea formaldehyde resin adhesive binder, prior to the formation of said products, said complexing agent present in an amount of 2 to 30 wt % of the total admixture; and (b) contacting said admixture of said complexing agent and said binder with said wood pieces/particles to provide adhesion therebetween.

11. A method according to claim 10, wherein said complexing agent is present in an amount of at least 5 wt% of the total admixture.

12. A method according to claim 10, further comprising mixing said complexing agent with a solvent or dispersant capable of promoting penetration of said complexing agent into said wood material.

13. A binder composition particularly suited for use in the manufacture of plywood, particle board or similar wood composite product, said binder containing a phenol formaldehyde or melamine urea formaldehyde resin as its adhesive component, comprising approx. 2–20 wt. % of a divalent sodium salt of EDTA or similar compound as a complexing agent low solubility into the binder composition under room temperature.

14. Plywood, particle board or similar wood composite product prepared according to claim 1.

* * * * *